United States Patent
Hsieh et al.

(10) Patent No.: US 6,934,145 B2
(45) Date of Patent: Aug. 23, 2005

(54) CERAMIC MULTILAYER CAPACITOR ARRAY

(75) Inventors: Yuan-Chung Hsieh, Kaohsiung (CN); Men-Tsuan Tsai, Kaohsiung (CN); Shiow-Chang Luh, Kaohsiung (CN)

(73) Assignee: Phycomp Holding B.V., Roermond (NL)

( * ) Notice: Subject to any disclaimer, the term of this patent is extended or adjusted under 35 U.S.C. 154(b) by 24 days.

(21) Appl. No.: 10/312,949

(22) PCT Filed: Jul. 5, 2001

(86) PCT No.: PCT/NL01/00510
§ 371 (c)(1),
(2), (4) Date: Aug. 7, 2003

(87) PCT Pub. No.: WO02/03405
PCT Pub. Date: Jan. 10, 2002

(65) Prior Publication Data
US 2004/0027735 A1 Feb. 12, 2004

(30) Foreign Application Priority Data
Jul. 6, 2000 (EP) .............................................. 00202406

(51) Int. Cl.⁷ ................................................ H01G 4/06
(52) U.S. Cl. ................................ 361/321.2; 361/301.4; 361/321.2; 361/321.5; 361/306.1; 361/306.3; 361/311; 361/313
(58) Field of Search .......................... 361/306.3, 306.1, 361/321.1, 321.2, 311, 313, 328, 329, 301.1, 301.4, 321.5, 308, 309, 303

(56) References Cited

U.S. PATENT DOCUMENTS

| | | | |
|---|---|---|---|
| 4,313,157 A | | 1/1982 | Fink |
| 5,583,738 A | * | 12/1996 | Kohno et al. ................ 361/312 |
| 5,880,925 A | | 3/1999 | DuPre et al. |
| 6,243,253 B1 | * | 6/2001 | DuPre et al. ............. 361/306.3 |

FOREIGN PATENT DOCUMENTS

DE  25 45 596  4/1977

* cited by examiner

Primary Examiner—Dean A. Reichard
Assistant Examiner—Nguyen T. Ha
(74) Attorney, Agent, or Firm—Oblon, Spivak, McClelland, Maier & Neustadt, P.C.

(57) ABSTRACT

A ceramic multilayer capacitor array having a plurality of capacitors in a surface mount compatible package. The array is constructed from a plurality of first dielectric plates, each of which has a first pattern of electrodes, and a plurality of second dielectric plates, each of which has a second pattern of electrodes. The second pattern of electrodes is substantially identical to the first pattern of electrodes, and is shifted with respect to the first pattern of electrodes. Each of the electrodes has at least one tab portion, which extends to at least one of the side faces of the package. Perpendicularly projecting first and second plates, the tab portions of the electrodes in the first plates are free from the tab portions of the electrodes in the second plates.

8 Claims, 3 Drawing Sheets

CERAMIC MULTILAYER CAPACITOR ARRAY

BACKGROUND OF THE INVENTION

1. Field of the Invention

The invention relates to a ceramic multilayer capacitor array.

2. Discussion of the Background

A ceramic multilayer capacitor array which will also be referred to as capacitor array hereinafter—is known from U.S. Pat. No. 5,880,925. This array includes a first pattern of electrodes with a main portion and a plurality of tab portions. The array further includes a second pattern containing four electrode each of which has a single tab portion. The first plates with first patterns and second plates with second patterns are alternately stacked.

A disadvantage of the known ceramic multilayer capacitor array is that it is not easily manufactureable. There is a large number of actions to be taken for its manufacture and complex equipment must be used.

SUMMARY OF INVENTION

It is therefore an object of the invention to provide a ceramic multilayer capacitor array, which can be manufactured easily.

According to one embodiment of the present invention, there is provided a ceramic multilayer capacitor array having a top face, and first and second pairs of opposing side faces. The array includes a plurality of first dielectric plates each having a first pattern of electrodes and a plurality of second dielectric plates each having a second pattern of electrodes alternately stacked. Each of the electrodes of the first dielectric plates includes at least one first tab portion mutually connected by first terminals, and each of the electrodes of the second dielectric plates includes at least one second tab portion mutually connected by second terminals. Each of the first and second tab portions extends to at least one of the side faces. Further the second pattern of electrodes is substantially identical to the first pattern of electrodes and is shifted with respect to the first pattern of electrodes such that the first tab portions are free from the second tab portions.

The first and second terminals do not interfere because the tab portions are free from each other. Further, the number of patterns is limited to one. Therefore, it is possible to easily manufacture a ceramic multilayer capacitor array.

Preferably, the capacitor array of the invention is manufactured by depositing a patterned layer of electrically conductive material onto a substrate on a sheet-level. Afterwards, the sheet can be separated, e.g. along cutting lines, into a multiplicity of plates.

A further advantage of the capacitor array of the invention is its low cost The number of patterns is decreased. The capacitor array has a lower defect rate. It can be manufactured according to a method, which can be executed on a sheet-level and which provides a high yield.

In an embodiment of the capacitor array of the invention, the second pattern of electrodes is shifted with respect to the first pattern of electrodes over substantially half the distance between two neighbouring tab portions at the same side face. Due to this effective use of available space, the distance between said tab portions, and hence between terminals, can be large. This leads to an ease of use of the capacitor array. Alternatively, the distance between said tab portions is kept minimal, and a the capacitor array is embodied in a small package such as (0805).

In a further embodiment of the capacitor array of the invention, the terminals are present at least at a side face of the first pair and at a side face of the second pair of side faces. Due to the first and the second pattern being identical this measure implies that in one of the patterns there is a tab portion of an electrode at a corner of the package. This is for example in the second pattern. The tab portions at the corner in several second plates can be connected at a side face of the first pair, but also at the other side face ending in the corner, which is a side face of the second pair of side faces. So, the terminals, connecting said tab portions at the corner can be present at different side faces having a mutual angle substantially unequal to 0 and 180°. Preferably the angle is substantially equal to 90°.

An advantage of this embodiment is the excellent ability to connect the terminals to conductive lines outside the capacitor array. A further advantage is that terminals at a single side faces can be broader, which turns out to lead to a lower inductivity of the capacitor array.

In another embodiment, the dielectric plates have a series of electrodes along the first pair of side faces of the package and have one electrode along the second pair of side faces of the package. An advantage of especially this embodiment of the capacitor array of the invention is that its chance of short-circuiting is small compared to the chance of short-circuiting in the known capacitor array. As there are four electrodes present in the second plate of the known capacitor array, these electrodes lie close to each other and the total length of the contours of the electrodes is large. Hence, the chance that a defect comes into existence during application of the electrode pattern, is quite large. Contrarily, in an embodiment of the capacitor array of the invention comprising four capacitors, the second plate only has three electrodes, which are separated from each other along a single edge. Hence the chance for short-circuiting is comparatively small.

In a further embodiment of the capacitor array of the invention, that each of the electrodes has at least two tab portions, of which one tab portion lies at one side face and one tab portion lies at the other side face of the first pair of side faces of the package. Preferably, the tab portions are located oppositely. An advantage of this embodiment of the capacitor array is its a lower stray inductance, compared to a similar capacitor array with only a single tab portion per electrode. The lower stray inductance leads to a better decoupling performance of the capacitor array.

In a still further embodiment of the capacitor array of the invention, the first pattern of electrodes and the second pattern of electrodes comprise symmetric structures, of which a line of symmetry lies along the second pair of side faces of the package. In this embodiment, the electrodes have such a symmetric structure or only a half of it. The capacitor array of this embodiment is very easily manufactureable. It provides a maximum space for the terminals. Besides, the terminals can be and preferably are present at all of the side faces of the package.

In a further embodiment of the capacitor array of the invention, the package contains at least four ceramic multilayer capacitors. Such a capacitor array can be provided in a size of package known in the field as (0612). It gives an excellent high frequency performance and has a good reliability.

It is to be understood that there is a variety of further embodiments of the capacitor array of the invention. The capacitor array can have a larger number of capacitors, such as seven or ten or twelve. The capacitor array can be embodied in various product sizes; preferably those sizes, which are in conformity with the standards in the field of passive components, such as the (0612), (1206), (0805), (1210), (1005), (1608). Various electrode materials and dielectric materials are applicable in the capacitor array of the invention. Examples of electrode materials are Ag, Cu, Ni, AgPd. Dielectric materials are preferably $BaTiO_3$-based and so called "class 1"-materials, but other dielectric materials known in the field of passive components manufacture may be used alternatively. The number of first plates, and the thickness of the dielectric layers can vary in conformity with the desired capacity. It is further to be understood that all of the described embodiments can be combined.

BRIEF DESCRIPTION OF THE DRAWINGS

These and other aspects of the method and of the ceramic multilayer capacitor array of the invention will be further explained with reference to the figures, of which.

DESCRIPTION OF EMBODIMENTS

Figure 1:
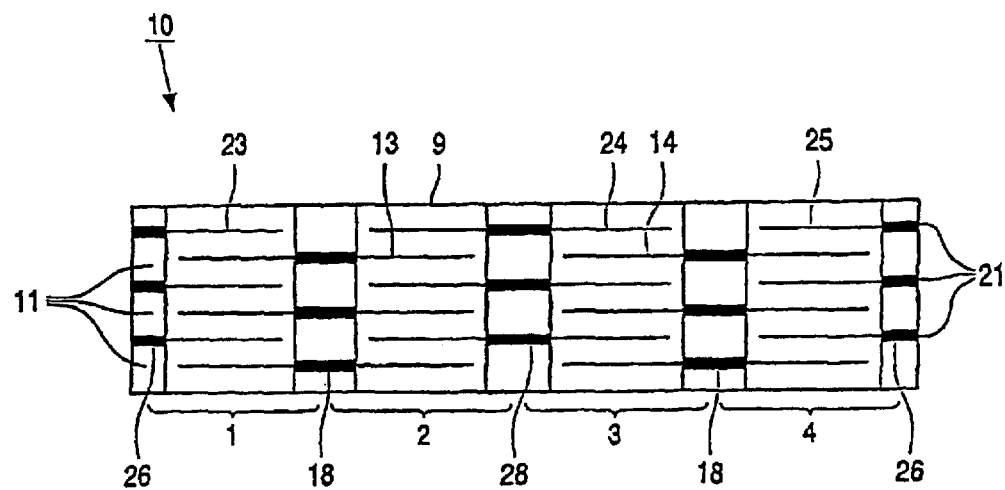
FIG. 1 shows schematically a cross-section of the ceramic multilayer capacitor array of the invention.

In FIG. 1 a cross-section of the ceramic multilayer capacitor array of the invention is schematically shown. The capacitor array 10 has four capacitors 1, 2, 3, 4. The array has in a surface mountable package 10 a plurality—i.e. three—of first dielectric plates 11 having a first pattern of electrodes 13,14 and a plurality—i.e. three—of second dielectric plates 21 having a second pattern of electrodes 23, 24, 25. Each of said electrodes 13, 14 has at least one tab portion 18. Each of said electrodes 24 has at least one tab portion 28. Each of said electrodes 23, 25 has at least one tab portion 26. The package 10 has a top face 9 substantially parallel to the first and second dielectric plates 11,12. It further has—as shown in FIGS. 2,3 and 4—a first pair of opposite side faces 38,39 and a second pair of opposite side faces 48,49.

Figure 2:
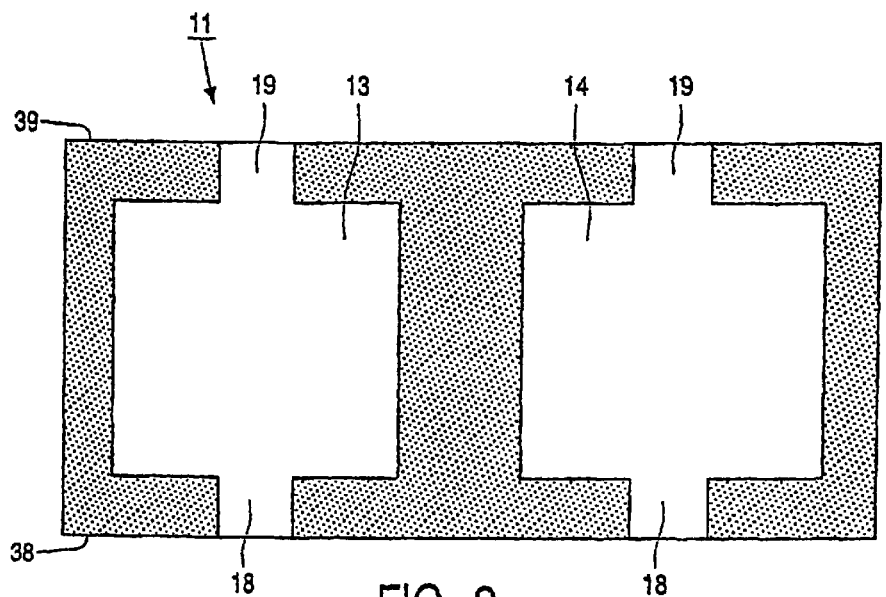
FIG. 2 shows schematically the first pattern of FIG. 1.

In FIG. 2 a first dielectric plate 11 with a first pattern of electrodes 13,14 is shown. The dielectrical plate comprises a $BaTiO_3$-based dielectric material X7R and has a thickness of 22 micrometer. Each of the electrodes has two—first—tab portions 18, 19. One 18 of the first tab portions extends to the one side face 38 of the first pair of side faces 38,39. The other 19 of the first tab portions extends to the other side face 39 of the first pair of side faces 38,39. The first pattern of electrodes 13,14 comprises symmetric structures of which a line of symmetry lies along the second pair of side faces 48,49 of the package 10.

Figure 3:
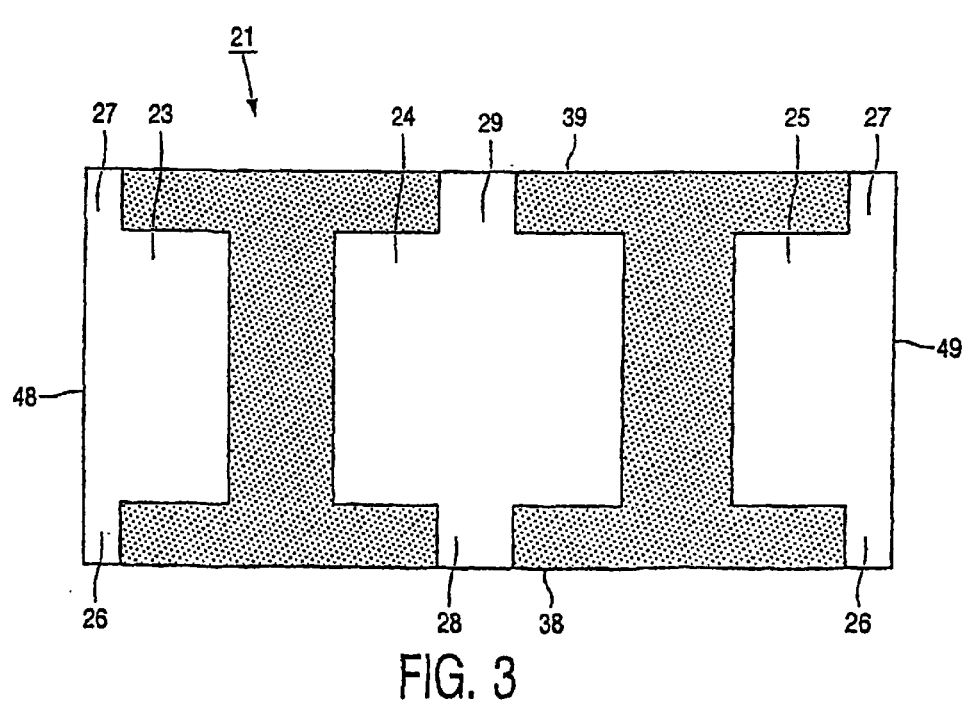
FIG. 3 shows schematically the second pattern of FIG. 1.
Figure 4:
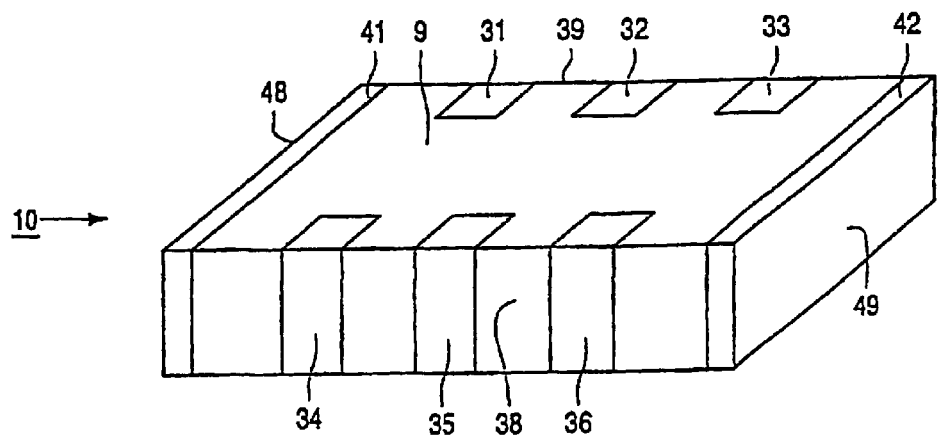
FIG. 4 shows schematically the ceramic multilayer capacitor array.

In FIG. 3 a second dielectric plate 21 with a second pattern of electrodes 23, 24, 25 is shown. The electrode 24 has two—second—tab portions 28, 29, which extend to the one side face 38 and the other side face 39 of the first pair of opposite side faces 38, 39 respectively. The electrodes 23, 25 have two—second—tab portions 26, 27, which extend to the side faces 38 and 39 respectively. The second tab portions 26, 27 of the electrode 23 also extend to the side face 48. The second tab portions 26, 27 of the electrode 25 also extend to the side face 49. The second pattern of electrodes 23, 24, 25 comprises symmetric structures, of which a line of symmetry lies along the second pair of side faces 48,49 of the package 10. The second pattern of electrodes 23, 24, 25 of the second dielectric plate 21 is identical to the first pattern of electrodes 13,14 and is shifted with respect to the first pattern of electrodes 13, 14. The shift is such that in a perpendicular projection of the first 11 and the second dielectric plate 12 onto the top face 9 the first tab portions 18, 19 are free from the second tab portions 26, 27, 28, 29. In this example, the shift has a size of substantially half the distance between two neighbouring tab portions 18 at the same side face 38.

As follows from FIGS. 2 and 3, the dielectric plates 11, 21 have a series of electrodes 13, 14; 23, 24, 25 along the first pair of side faces 38,39 of the package 10 and have one electrode along the second pair of side faces 48,49 of the package 10. It further can be seen, that each of the electrodes 13, 14; 23, 24, 25 has at least two tab portions 18, 19; 26, 27,28, 29. Of said tab portions one tab portion 18, 26, 28 lies at one side face 38 and one tab portion 19,27,29 lies at the other side face 39 of the first pair of side faces 38,39 of the package 10.

In FIG. 4 the package 10 of ceramic multilayer capacitor array of the invention is schematically shown. Attached to the side faces 38, 39 of the package 10 are terminals 31–36. Attached to the side faces 48, 49 of the package 10 are terminals 41, 42. Of said terminals 31–36, 41–42 the terminals 31, 33, 34, 36 are the first terminals, which connect the first tab portions 18, 19 of the electrodes 13,14 in several first plates 11 with each other. Thus, first terminal 31 connects the first tab portions 19 of electrodes 13 in several first plates 11 with each other. First terminal 33 connects the first tab portions 19 of electrodes 14 in several first plates 11 with each other. First terminal 34 connects the first tab portions 18 of electrodes 13 in several first plates 11 with each other. First terminal 36 connects the first tab portions 18 of electrodes 14 in several first plates 11 with each other.

Of said terminals 31–36, 41–42 the terminals 32, 35, 41–42 are the second terminals, which connect the second tab portions 26,27, 28, 29 with each other. Thus, second terminal 32 connects the second tab portions 29 of electrodes 24 in several second plates 21 with each other. Second terminal 35 connects the tab portions 28 of electrodes 24 in several second plates 21 with each other. Second terminal 41 connects the tab portions 26,27 of electrode 23 in several second plates 21 with each other. Second terminal 42 connects the tab portions 26,27 of electrode 25 in several second plates 21 with each other. As is clear from FIG. 4, the terminals 31–36, 41,42 are present at least at a side face 38, 39 of the first pair and at a side face 48, 49 of the second pair of side faces 38, 39, 48, 49. In this example, terminals are present at all side faces 38, 39, 48, 49.

Figure 5:
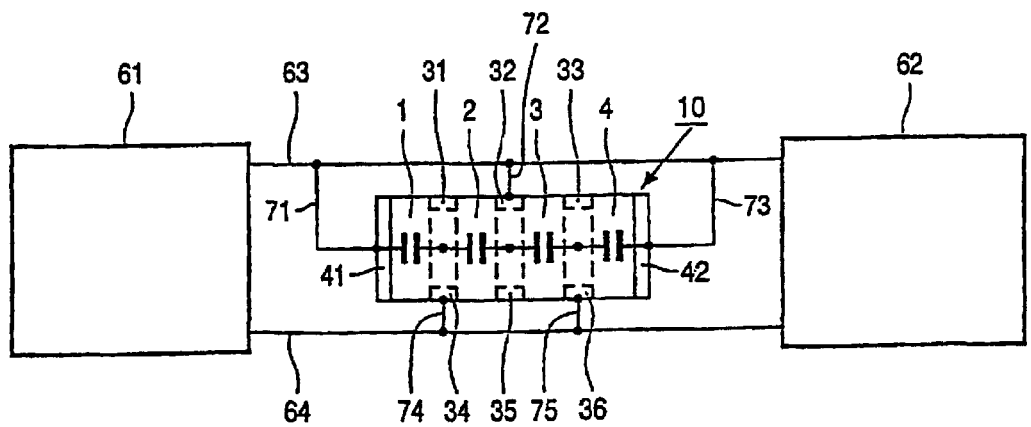
FIG. 5 shows an application of the ceramic multilayer capacitor array.

In FIG. 5 an application of the ceramic multilayer capacitor array 10 is shown, wherein the array 10 is present between two wires 63, 64. The wires 63, 64 connect a voltage regulator 61 and a processor 62. In this example the wire 63 is on a higher voltage than the wire 64. The array 10 is connected to the wire 63 by means of three connections 71, 72, 73. It is connected to the wire 64 by means of two connections 74, 75. Because the voltage difference in the capacitors 1 and 3 is directed in the opposed direction with respect to the capacitors 2 and 4, the inductance of the ceramic multilayer capacitor array 10 is very small.

In order to improve the decoupling performance of the capacitor array 10 further, the terminations 31 and 33 can be connected to wire 64 by means of connections passing through the substrate twice. Also the termination 32 can be connected to wire 63 by means of such a connection. Alternatively, in order to reduce the cost price of the capacitor array, three of the terminations 31–36 could be absent. Further on, it is not necessary that the terminations 41 and 42 cover the side faces 48 and 49 respectively. These terminations 41, 42 could be present at any position of said side faces 48, 49 only.

Figure 6:
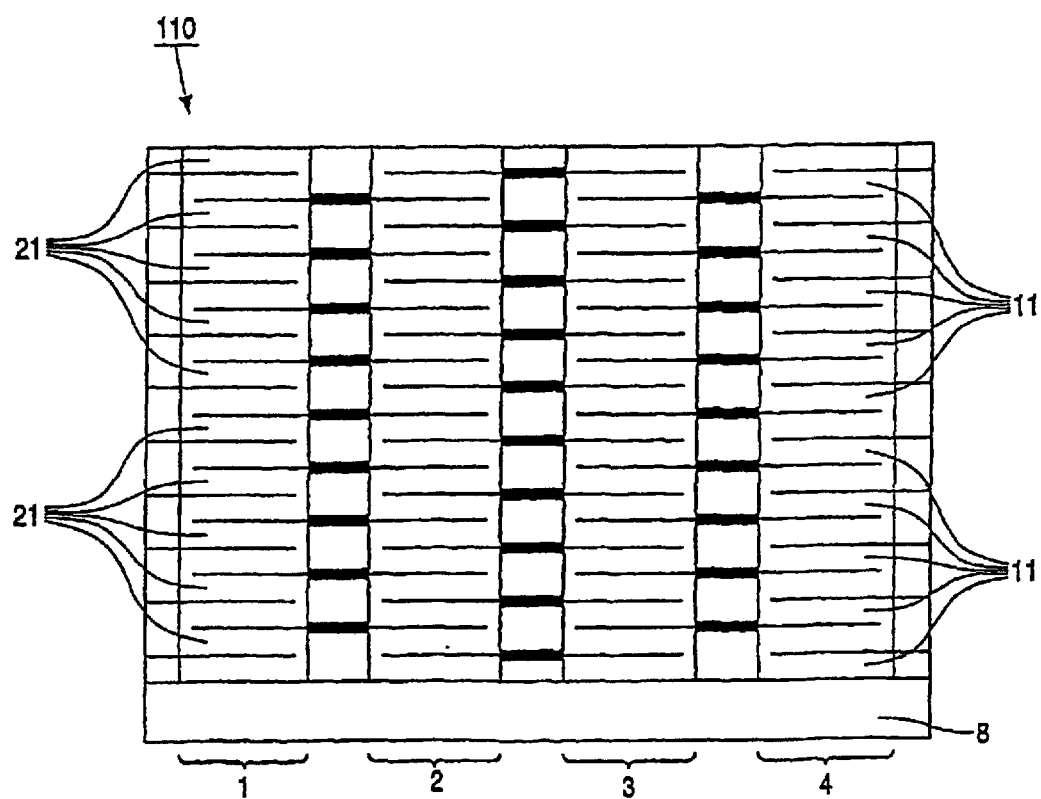
FIG. 6 shows schematically a cross-section of a side face of a second embodiment of the ceramic multilayer capacitor array of the invention.

FIG. 6 shows schematically a cross-section of the ceramic multilayer capacitor array 110. This array 110 comprises 10 first plates 11 and 10 second plates 21 as well as a substrate 8. For the dielectrical layers 12, 22 use is made of the $BaTiO_3$-based material Y5V, which layer has a thickness of 66 micrometers. The electrode material is Ni. The capacitor array 110 has a size known as (1206), which is about 3.2 times 1.6 millimeters. The capacitance per capacitor in the array 110 is about 25 nF.

What is claimed is:

1. A ceramic multilayer capacitor array having a top surface, a first pair of opposing side faces, and a second pair of opposing side faces, comprising:

a plurality of first dielectric plates each having a first pattern of electrodes; and a plurality of second dielectric plates each having a second pattern of electrodes, wherein the first and second dielectric plates are alternately stacked, each of the electrodes of the first dielectric plates includes at least first tab portions, one of the first tab portions extending to one side face of the first pair of side faces and another one of the first tab portions extending to another side face of the first pair of side faces, said first tab portions being mutually connected by first terminals, each of the electrodes of the second dielectric plates includes at least two second tab portions, one of the second tab portions extending to one side face of the first pair of side faces and another one of the second tab portions extending to another side face of the first pair of side faces, said second tab portions being mutually connected by second terminals, and the second pattern of electrodes is substantially identical to the first pattern of electrodes and is shifted with respect to the first pattern of electrodes such that the first tab portions are not overlapping the second tab portions.

2. A ceramic multilayer capacitor array as claimed in claim 1, wherein the second pattern of electrodes is shifted with respect to the first pattern of electrodes over substantially half the distance between two neighboring tab portions on a same side face.

3. A ceramic multilayer capacitor array as claimed in claim 1, wherein the terminals are present at least on one side face of the first pair and on one side face of the second pair of side faces.

4. A ceramic multilayer capacitor array as claimed in claim 1, wherein the dielectric plates include a series of electrodes along the first pair of side faces and one electrode along the second pair of side faces.

5. A ceramic multilayer capacitor array as claimed in claim 2, wherein the first pattern of electrodes and the second pattern of electrodes include symmetric structures, a line of symmetry lying along the second pair of side faces.

6. A ceramic multilayer capacitor array as claimed in claim 1, wherein the terminals are present on all side faces.

7. A ceramic multilayer capacitor array as claimed in claim 1, wherein the array includes at least four ceramic multilayer capacitors.

8. A ceramic multilayer capacitor array as claimed in claim 3, wherein the terminals are present on all side faces.

* * * * *